(12) United States Patent  (10) Patent No.: US 8,158,885 B2
Eastin  (45) Date of Patent: Apr. 17, 2012

(54) PAINTABLE WALL PLATE COVERING AND METHOD

(76) Inventor: Susan Eastin, De Smet, SD (US)

( * ) Notice: Subject to any disclaimer, the term of this patent is extended or adjusted under 35 U.S.C. 154(b) by 228 days.

(21) Appl. No.: 12/718,563

(22) Filed: Mar. 5, 2010

(65) Prior Publication Data

US 2010/0155100 A1 Jun. 24, 2010

Related U.S. Application Data

(63) Continuation-in-part of application No. 12/171,732, filed on Jul. 11, 2008, now Pat. No. 7,674,976.

(60) Provisional application No. 60/959,561, filed on Jul. 13, 2007.

(51) Int. Cl.
*H02G 3/14* (2006.01)
(52) U.S. Cl. ............................. 174/66; 174/67; 439/148
(58) Field of Classification Search ............. 174/66.67; 220/241, 242; 439/148, 271
See application file for complete search history.

(56) References Cited

U.S. PATENT DOCUMENTS

| 3,155,808 | A | * | 11/1964 | Wiley | 200/330 |
| 3,199,063 | A | * | 8/1965 | Stuart | 439/536 |
| 4,293,173 | A | | 10/1981 | Tricca | |
| 5,457,286 | A | * | 10/1995 | Flasz | 174/66 |
| 5,675,125 | A | | 10/1997 | Hollinger | |
| 6,423,900 | B1 | | 7/2002 | Soules | |
| 7,582,830 | B2 | * | 9/2009 | Claffy | 174/67 |

* cited by examiner

*Primary Examiner* — Dhirubhai R Patel
(74) *Attorney, Agent, or Firm* — The Marbury Law Group PLLC

(57) ABSTRACT

Disclosed embodiments relate to a wall plate, such as for light switches and electrical outlets, that may be painted to coordinate with the color of a room's walls, trim, or décor. The wall plate includes a transparent cover plate and an optional backing. A reverse side of the transparent cover plate has a prepared surface that is intentionally adapted to be painted by being textured, deglossed, roughened, etched, treated, sandblasted, or the like. In use, the optional backing can cover and protect the painted surface. The transparent cover plate can be made of molded thermoplastic resin and the backing can be a plate or sheet of suitable material. Both will typically contain openings to provide access to switches, outlets, plugs, jacks, mounting posts, etc., as well as any holes requires by fasteners such as screws.

13 Claims, 6 Drawing Sheets

PAINTABLE WALL PLATE COVERING AND METHOD

RELATED APPLICATIONS

This application is a continuation-in-part of U.S. application Ser. No. 12/171,732, filed Jul. 11, 2008 and issued as U.S. Pat. No. 7,674,976, which claims the benefit of U.S. Provisional Application Ser. No. 60/959,561 filed Jul. 13, 2007, both of which are hereby incorporated by reference in their entirety.

BACKGROUND

The embodiments disclosed herein are drawn to an apparatus and method for providing a paintable wall plate or receptacle cover, such as those used to cover electrical switch and outlet boxes mounted on walls. A substantially transparent outer plate has a paintable reverse side and can also have an opening and one or more holes for mounting screws. An optional concealed backing material covers and protects the painted reverse side and includes matching opening and/or mounting screw hole(s). The cover plate and optional backing are then mounted to provide a painted wall plate covering with improved aesthetics and durability.

The majority of standard wall plates and receptacle covers are available in two colors, white or beige, to generally match the typical wall or trim color. If a user desires the plate to match the color of a panted wall or coordinate with tile, brick, stone, wood, and other surfaces, standard wall plates may be painted to match. However, applying paint to the surface of a standard wall plate results in an unsightly appearance caused by paint imperfections such as runs, brush strokes, and roller marks, as well as scratching, peeling, chipping, wear, and other damage caused by poor paint adherence qualities and incidental contact with users' hands and the prongs from power cords. One prior art attempt to solve this is white or beige plates or covers that have a pre-textured, pre-primed outer surface to improve paint adherence. However, the texture of the resulting painted surface tends to collect dirt from users hands on switch plates during contact. The painted surface is also left vulnerable to scratches, wear, and other damage

BRIEF SUMMARY OF THE INVENTION

Disclosed embodiments relate to a wall plate assembly, such as for light switches and electrical outlets, which may be painted to coordinate with the color of a room's walls, trim, or décor. The wall plate assembly comprises a transparent cover plate and an optional concealed backing plate or sheet of backing material. A reverse side of the transparent cover plate is textured, deglossed, roughened or otherwise prepared so that it can be painted. Both the cover plate and the optional backing can be made of molded thermoplastic resin and will typically contain openings to provide access to switches, outlets, plugs, jacks, mounting posts, etc., as well as any holes required by fasteners such as screws. In a preferred embodiment, the optional backing is die-cut foam.

In one embodiment for covering a receptacle box, the cover plate and the backing are joined together at the screw passage points. Each screw opening on the cover plate has a cylindrical protrusion that extends from the reverse side. The cylindrical protrusion frictionally secures to a screw opening on the backing. Alternately, interlocking elements could be provided at the access opening or the edge of the cover plate and the backing.

In one embodiment for covering a receptacle box, a concealed backing material is placed behind the reverse surface of the cover plate prior to installation. The backing material may be molded or die-cut and made of thermoplastic resin, metal, foam, paper, cork, or other suitable material.

The reverse side of the transparent cover plate is textured, deglossed, roughened or otherwise prepared so that it can be painted. In a preferred embodiment, the reverse side of the transparent cover plate has a pre-textured surface that is adapted for brush-on, roll-on, or spray-on paint application. The pattern of the pre-textured surface can be selected from a group of textures known to the manufacturing industry (e.g. stipple, matte, geometric, leather, brush finish, wood grain, and watermark.) Because paint is applied to the reverse side of the transparent cover plate, the paint is viewed through the transparent front face of the cover plate and conforms to the prepared surface. This protects the paint from wear and damage and also hides any surface imperfections in the paint such as runs, brush strokes, drips and roller marks (which face and are visible only in the opposite direction).

Once the applied paint is dry, an optional backing can be placed behind the cover plate for the purpose of providing a protective covering over the surface of the painted area. The backing may also be connected to the reverse side of the cover plate. The assembly of the cover plate, applied paint and optional backing can act as a single unit and may be attached over the junction box using screws. Other embodiments can use any suitable means for attachment of the assembly over the receptacle box.

DETAILED DESCRIPTION OF THE INVENTION

As used herein, the term cover plate or wall plate refers to switch cover plates, outlet receptacle plates, and plates or covers for any other type of receptacle box. The term receptacle box refers to any electrical junction box used for electrical wiring connections, including but not limited to electrical switches, electrical power outlets, electrical lights, electrical ceiling fans, telephone jacks, speaker wire outlets, antenna wire outlets, and cable-TV or data outlets. The term wall refers to walls, floors, and ceilings. The term transparent refers to materials that are substantially optically clear or translucent, as well as tinted variations, both darker and lighter, thereof.

As used herein, the term prepared surface or pre-prepared surface refers to a surface on the reverse side of the transparent cover plate that has been specially and intentionally adapted for the application of paint. This adaptation can take the form of an intentionally textured, deglossed, roughened, etched, treated or sand-blasted surface or a surface otherwise prepared so that it can be readily painted without additional preparation.

Figure 1:
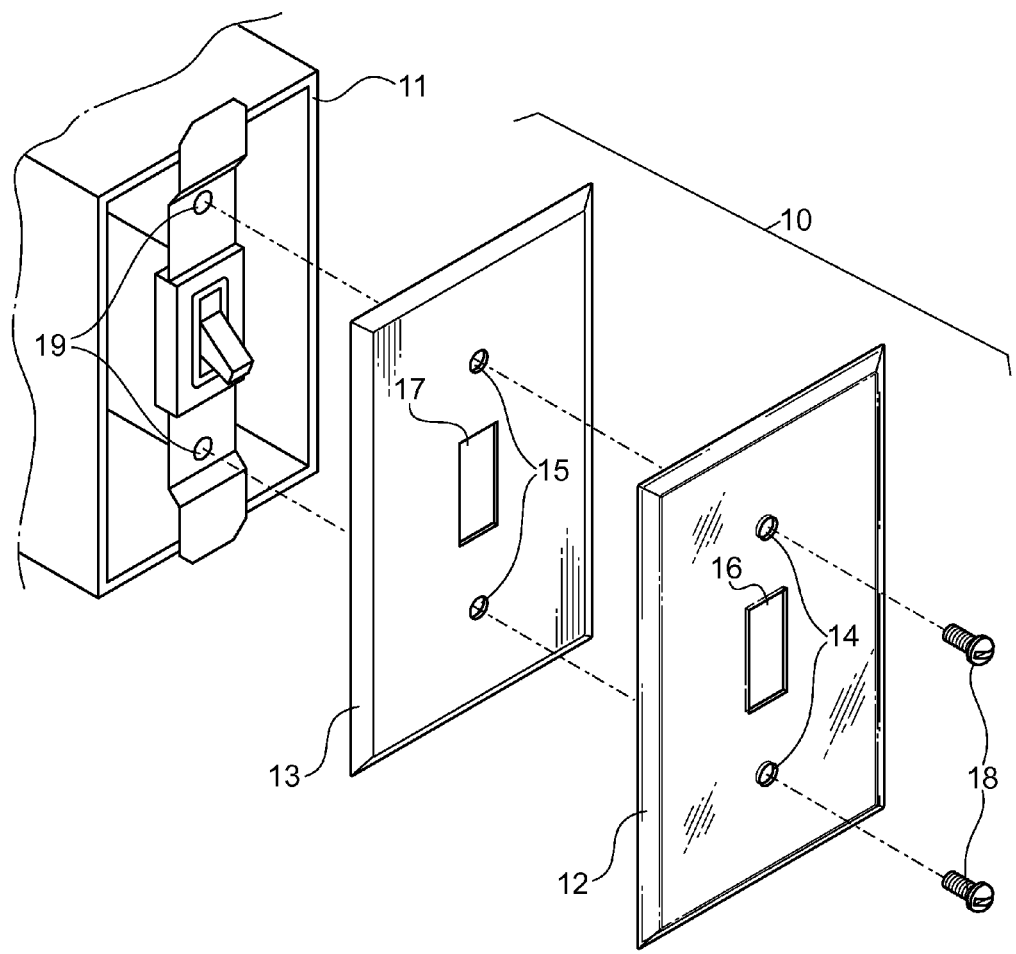
FIG. 1 illustrates an embodiment of an exploded view of an assembly used with a light switch.
Figure 2:
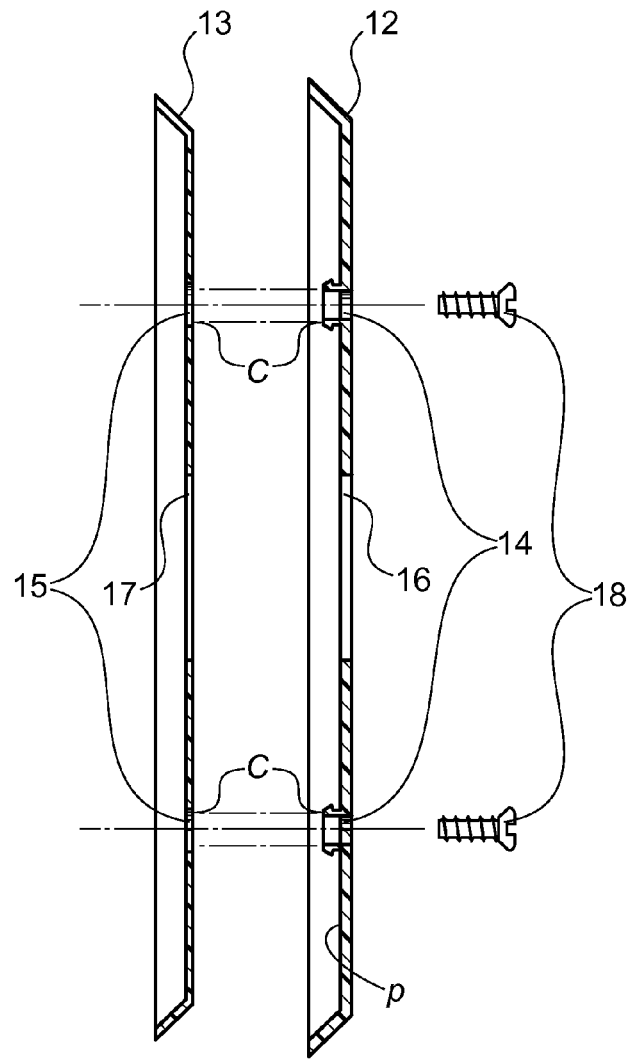
FIG. 2 illustrates a cross section of an embodiment.

FIGS. 1 and 2 illustrate an embodiment of a paintable wall plate covering assembly. In this embodiment, the wall plate assembly 10 is for covering an electrical light switch junction box 11 and uses a pair of screws 18 that attach to the threaded holes 19 on the light switch hardware (not shown in FIG. 2). The wall plate assembly 10 comprises a transparent cover plate 12 and an optional backing 13 in the form of a plate. The backing is typically formed of molded thermoplastic resin, but can be molded or die-cut and made of thermoplastic resin, metal, foam, paper, cork, or other suitable material. The transparent cover plate 12 in this example includes a pair of screw holes 14 and a switch opening 16. The backing 13 also includes a pair of screw holes 15 and a switch opening 17 that are positioned to coincide with those from cover plate 12.

In a basic form, the prepared surface P (see FIG. 2) on the reverse side of transparent cover plate 12 is painted. While it is possible to then mount cover plate 12 over the junction box 11, the paint on the prepared surface P of cover plate 12 is unprotected and can be damaged by an arcing switch or scratched during mounting and subsequent dismounting. To protect the paint on the prepared surface P on the reverse side of transparent cover plate 12, an optional backing 13 can be used and is preferably connected or secured to the transparent cover plate 12 by a connection means that is not visible through the transparent cover plate 12 and that does not mar the paint on prepared surface P. One example of a connection means is illustrated in FIG. 2 by connection C, which comprises generally cylindrical projections extending from the reverse side of screw holes 14 that are dimensioned to frictionally engage screw holes 15 on backing 13. The assembly 10 is then attached to junction box 11 using screws 18. In such usage, the attached backing 13 will protect the paint on prepared surface P from damage by an arcing switch or from possible scratching during mounting and subsequent dismounting/mounting of the plate assembly 10.

Figure 3:
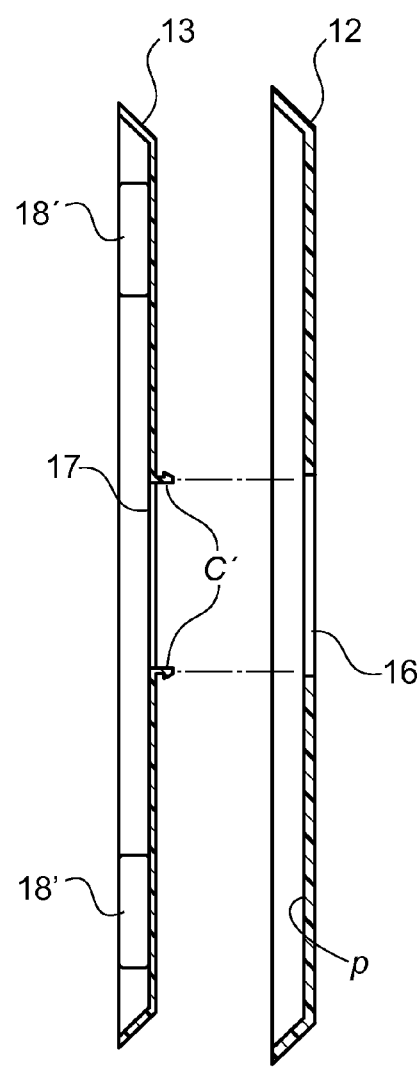
FIG. 3 illustrated a cross section of another embodiment.

While this arrangement is used for the disclosed light switch hardware, it will be understood by those in the art that the type, number and position of fasteners 18 can vary depending on the application. For example, typical power outlet receptacle covers use a single screw and typical multi-switch outlet covers with use a pair of screws for each switch. The type of fastener can also be varied. For example, fasteners 18' in the form of magnets (adhesively or mechanically attached) can be used on the reverse side of the backing 13 to eliminate the use screws altogether. In such a case, as illustrated in FIG. 3, an attachment structure C' associated with the switch or outlet openings 16 and 17 can be used to secure the transparent cover plate 12 to the backing 13. While illustrated with C' extending from opening 17 to engage the edge of opening 16, it is also possible to have the connection C' extend inward from the reverse side of opening 16 to engage the edge of opening 17. If the plate is a blank without a switch or outlet opening (not illustrated), the attachment structure can be formed as part of screw holes as shown in FIG. 2 or as part of the respective plate edges. While frictional attachment of the cover plate to the backing has been discussed, one of ordinary skill in the art will also understand that other means can be used to attach a backing to the painted reverse side of the cover plate, such as hook and loop fasteners, adhesives or cling material (including static-based attachment) without departing from the invention.

Figure 4A:
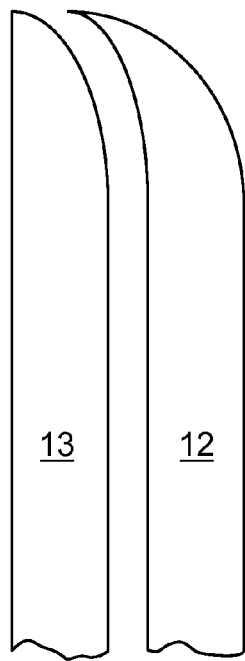
FIGS. 4A-4C illustrate a various embodiments of edge configurations.
Figure 4B:
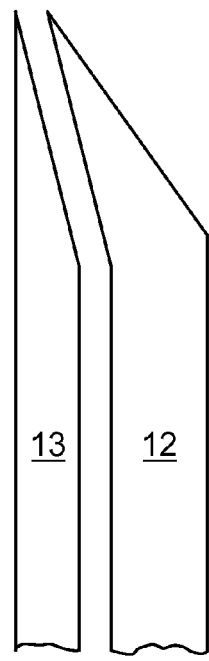
Figure 4C:
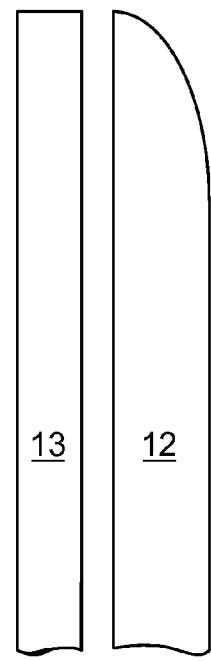

The cover plate 12 and backing 13 are illustrated in FIGS. 1-3 as having beveled edges, as are commonly found on wall plate covers. The only requirement for the edges is that the edge of the backing, if rigid, be dimensioned and in a plane for contact with a wall surface adjacent the receptacle box. Flexible backing, such as die-cut foam or paper, will naturally conform to the adjacent wall surface. In the illustrated embodiment, the backing 13 is rigid and nests within the reverse side of transparent cover plate 12. However, neither the beveled edges nor the nesting are required for practice of the invention and numerous other arrangements are contemplated. For example, FIG. 4A illustrates an example of curved edges on both cover plate 12 and backing 13. FIG. 4B illustrates cover plate 12 and backing 13 as having different bevels, which allows the painted reverse surface of transparent cover plate 12 to extend to the outer edge. FIG. 4C illustrates transparent cover plate 12 as having a flat reverse surface and curved front surface (which could also be beveled, stepped, flat, or any other desired shape). In this arrangement, backing 13 is flat and does not nest within cover plate 12.

Figure 5:
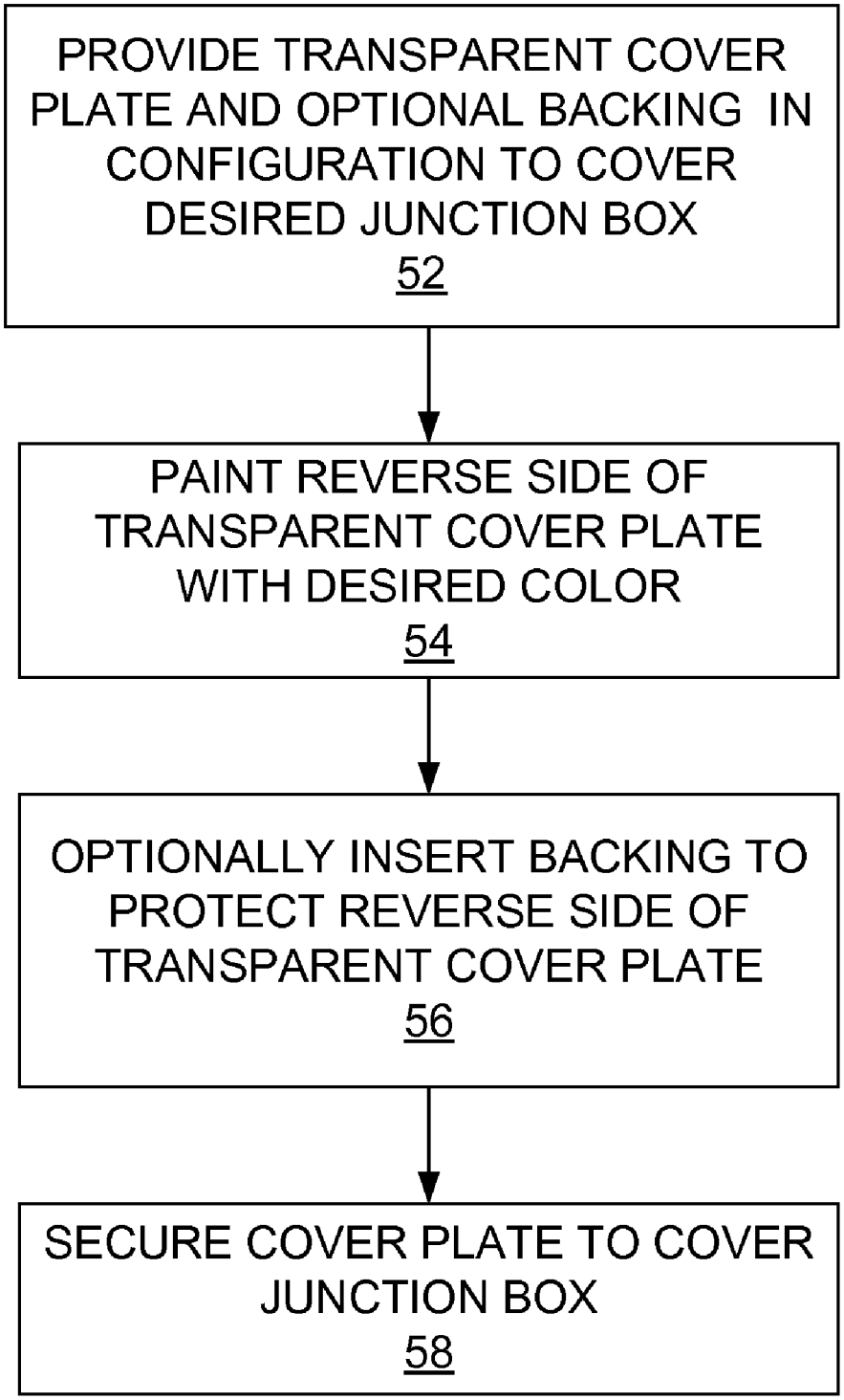
FIG. 5 illustrates a diagram of a process embodiment.

In use, as illustrated in FIG. 5, a transparent cover plate and optional backing are provided in a configuration to cover the desired junction box at 52. Depending on the type of junction box to be covered, the shape and size of the cover plate/backing and the shape, size, and positions of any openings for access and attachments are used to determine the configuration. Cover plate shapes will typically include rectangular, square, octagonal, round, and oval shapes. Access openings can be rectangular (for rocker switches, etc.), square (for phone and data jacks, etc.), round (for dimmers, coaxial cable, power outlets, fan mounts, light mounts, etc.), or irregular (for power outlets, etc.).

The reverse side of the transparent cover plate is then painted the desired color (or colors, such as if a faux finish or multicolor design is desired—note however that the application of colors would be reversed) at 54. While the front and reverse surface of the transparent cover plate will typically be substantially flat, either or both of these surfaces may be textured to provide a desired aesthetic appearance or a translucent appearance. Similarly, while the transparent cover plate will typically be clear, it may be tinted to provide a desired shade of the paint color, e.g., tinted darker to provide a darker shade, tinted with a slightly opaque amount of white to lighten the shade, or even tinted with a color.

Indeed, while many embodiments will use a clear cover plate, such that the painted reverse surface will allow the cover plate to blend into the wall, it may also be desirable to draw attention to the cover plate with ornamentation such as sparkles, flowers, cartoon characters, stripes, patterns, borders, etc. that are pre-applied to the prepared surface on the reverse side of the cover plate, with the remaining portions being transparent. As such, when the prepared surface is painted, the pre-applied ornamentation will have a background of the desired color.

The optional backing is inserted and preferably secured to the transparent plate to form an assembly at 56. It is preferable to form the assembly so that the backing will protect the paint applied to the prepared surface. Regardless of the application method, the paint will conform to the shape of the prepared surface on the reverse side of the cover plate. In this manner, brush or roller marks are eliminated from view. The transparent cover plate, preferably in an assembly with the optional backing, is then secured to the junction box at 58 in the manner suited to the configuration (i.e., with a single or with multiple screws, with magnets, etc.).

Figure 6:
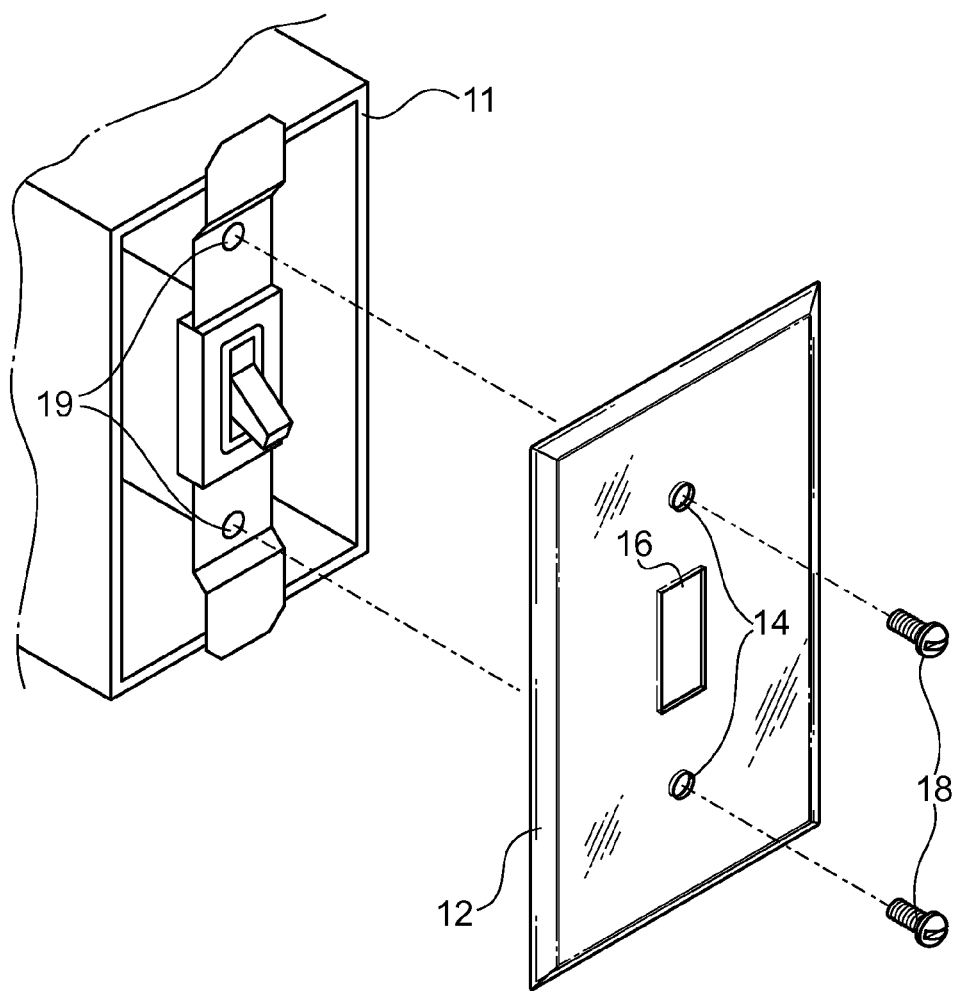
FIG. 6 illustrates a basic embodiment.

FIG. 6 illustrates an embodiment of a paintable transparent cover plate, without any backing. In this embodiment, the cover plate 12 is for covering an electrical light switch junction box 11 and uses a pair of screws 18 that attach to the threaded holes 19 on the light switch hardware, although these are not meant to be limitations.

In this embodiment without a backing, the prepared surface P (see FIG. 2) on the reverse side of transparent cover plate 12 is painted. After the paint dries, the cover plate 12 is mounted over the junction box 11 using screws 18 to engage holes 19. In such usage, the paint on prepared surface P is not protected from damage by an arcing switch or from possible scratching during mounting and subsequent dismounting/mounting of the cover plate 12, so suitable clearance between the cover plate 12 and the receptacle box 11 is preferred.

Figure 7:
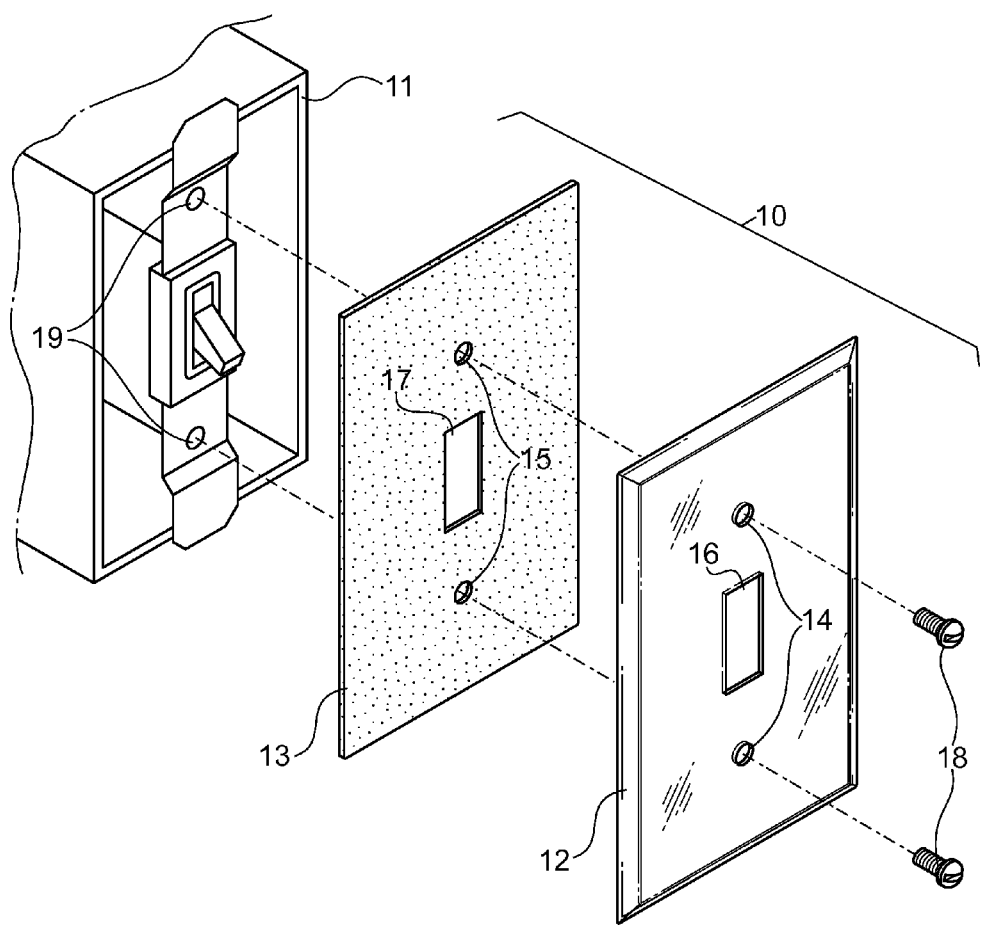
FIG. 7 illustrates an embodiment with a backing material.

FIG. 7 illustrates an embodiment of a paintable transparent cover plate that uses a die-cut foam backing. In this embodiment, the wall plate assembly 10 is for covering an electrical light switch junction box 11 and uses a pair of screws 18 that attach to the threaded holes 19 on the light switch hardware. The wall plate assembly 10 comprises a transparent cover plate 12 and an optional backing 13 in the form of a die-cut sheet of foam material. Such a flexible backing could also be made from paper, cork, or other suitable material. The transparent cover plate 12 in this example includes a pair of screw holes 14 and a switch opening 16. The backing 13 also includes a pair of screw holes 15 and a switch opening 17 that are positioned to coincide with those from cover plate 12.

In this embodiment, the prepared surface P (see FIG. 2) on the reverse side of transparent cover plate 12 is painted. To protect the paint on the prepared surface P on the reverse side of transparent cover plate 12, the flexible backing 13 is used and is preferably connected or secured to the transparent cover plate 12 by a connection means that is not visible through the transparent cover plate 12 and that does not mar the paint on prepared surface P. The assembly 10 is then attached to junction box 11 using screws 18. In such usage, the flexible backing 13 protects the paint on prepared surface P from damage by an arcing switch or from possible scratching during mounting and subsequent dismounting/mounting of the wall plate assembly 10. One preferred method to secure the die-cut foam backing 13 to the transparent cover plate 12 is for screw holes 15 and/or an access hole 17 in backing 13 to frictionally engage a corresponding extension from the reverse side of transparent cover plate 12, such as those disclosed relative to FIGS. 2-3.

A paintable wall plate covering and method has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A paintable wall plate, comprising:
   a transparent cover plate, the transparent cover plate further comprising:
      a front side, and
      a reverse side comprising a prepared surface that has been intentionally adapted for the application of paint;
   a backing plate;
   wherein the transparent cover plate further comprises at least one access hole for components on the receptacle box and means for attachment to a receptacle box;
   wherein the means for attachment to the receptacle box comprises a screw hole in the cover plate, the cover plate further comprising an attachment structure wherein the attachment structure comprises a substantially-cylindrical extension from a reverse side of a screw hole in the cover plate and a screw hole in the backing plate; and a widened portion in a front side of a screw hole in the backing plate dimensioned for attachment to the substantially-cylindrical extension.

2. The paintable wall plate of claim 1, wherein the prepared surface is selected from the group comprising textured surfaces, deglossed surfaces, roughened surfaces, etched surfaces, treated surfaces or sand-blasted surfaces.

3. The paintable wall plate assembly of claim 1, wherein the backing plate is formed of thermoplastic resin.

4. The paintable wall plate assembly of claim 1, wherein the backing plate is formed of flexible material.

5. The paintable wall plate assembly of claim 4, wherein the flexible material is selected from the group consisting of foam, cork, paper, and plastic.

6. The paintable wall plate assembly of claim 5, wherein the flexible material is die-cut.

7. A method of covering a receptacle box with a painted wall plate, comprising:
   applying paint to a prepared surface on a reverse side of a transparent cover plate, the prepared surface being intentionally adapted for the application of paint;
   allowing the paint to dry; and
      attaching the painted cover plate to a receptacle box with the reverse side facing the receptacle box, wherein a screw is used to secure the painted cover plate to the receptacle box through a screw hole in the painted cover plate and a screw hole in a backing plate;
      attaching the backing plate to the reverse side of the painted cover plate with a substantially-cylindrical extension from a reverse side of the screw hole in the painted cover plate that attaches to a widened portion in a front side of the screw hole in the backing plate; and
   snapping the substantially-cylindrical extension into the widened portion.

8. The method of claim 7, wherein the prepared surface is intentionally adapted from the group comprising being: textured, deglossed, roughened, etched, treated or sand-blasted.

9. The method of claim 7, further comprising covering the paint on the prepared surface with a backing comprising sheet material dimensioned to cover the prepared surface.

10. A method of making a paintable wall plate, comprising:
    forming a cover plate for a receptacle box out of transparent material, the cover plate comprising a front side for facing away from a wall and a reverse side for facing the receptacle box and further comprising at least one attachment hole in the cover plate and at least one receptacle box access hole in the cover plate;
    a screw hole in the cover plate a substantially-cylindrical extension from a reverse side of the screw hole in the cover plate
    a backing plate
    a screw hole in the backing plate
    and
    intentionally adapting the reverse side of the cover plate to accept an application of paint to form a prepared surface
    attaching the backing plate to the reverse side of the cover plate with the substantially-cylindrical extension from the reverse side of the screw hole in the cover plate by attaching the substantially cylindrical extension to a widened portion in a front side of the screw hole in the backing plate, and snapping the substantially-cylindrical extension into the widened portion.

11. The method of claim 10, wherein the prepared surface is formed from the group comprising being: textured, deglossed, roughened, etched, treated or sand-blasted.

12. The method of claim 10, further comprising forming a backing of sheet material dimensioned to cover the prepared surface.

13. The method of claim 12, further comprising forming the backing by cutting the sheet material with a die.

* * * * *